United States Patent [19]
Collins et al.

[11] Patent Number: 5,297,773
[45] Date of Patent: Mar. 29, 1994

[54] PLASTIC VALVE WITH FLEXIBLE TUBE AND TUBE SQUEEZING APPARATUS

[75] Inventors: Timothy R. Collins, Cologne; Robert T. Chinnock, Victoria; Dean T. Hamilton, Cologne, all of Minn.

[73] Assignee: Fluoroware, Inc., Chaska, Minn.

[21] Appl. No.: 92,690

[22] Filed: Jul. 16, 1993

[51] Int. Cl.⁵ .................................................. F16K 7/00
[52] U.S. Cl. .......................................... 251/4; 251/9; 138/141
[58] Field of Search ............................. 251/4, 5, 9, 10; 138/128, 141

[56] References Cited

U.S. PATENT DOCUMENTS

| | | | |
|---|---|---|---|
| 2,622,837 | 12/1952 | Goodman | 251/9 |
| 4,478,661 | 10/1984 | Lewis | 138/141 X |
| 4,523,738 | 6/1985 | Roftis et al. | 251/4 |
| 4,929,293 | 5/1990 | Osgar | . |

OTHER PUBLICATIONS

Crane Co., Resistoflex, TFE Clamp Valve, 1986, pp. 1-14.

Primary Examiner—John C. Fox
Attorney, Agent, or Firm—Palmatier, Sjoquist & Helget

[57] ABSTRACT

A plastic valve comprising a valve body, integral plastic valving duct means with rigid tubular plastic end portions for attachment to flow ducts carrying liquids to be valved, and a collapsible and distensible tubular plastic valving portion welded to the tubular end portions, the valving portion have sidewalls of plastic film laminae free of each other, but welded to each other at edges to form resilient side rib portions, squeezing linkages traversing flexible wall portions and applying squeezing pressure onto the flexible wall portions to close the flow passage therebetween, tiltable squeeze bars extending along the flexible wall adjacent the squeezing linkages and progressively deforming the flexible wall portions during application of squeezing pressure, camming impeller portions applying and relieving squeezing pressure against the squeezing linkages and squeeze bars and camming against the camming surfaces of the body portion as a driving head moves the impeller portions in the valve body portion.

22 Claims, 4 Drawing Sheets

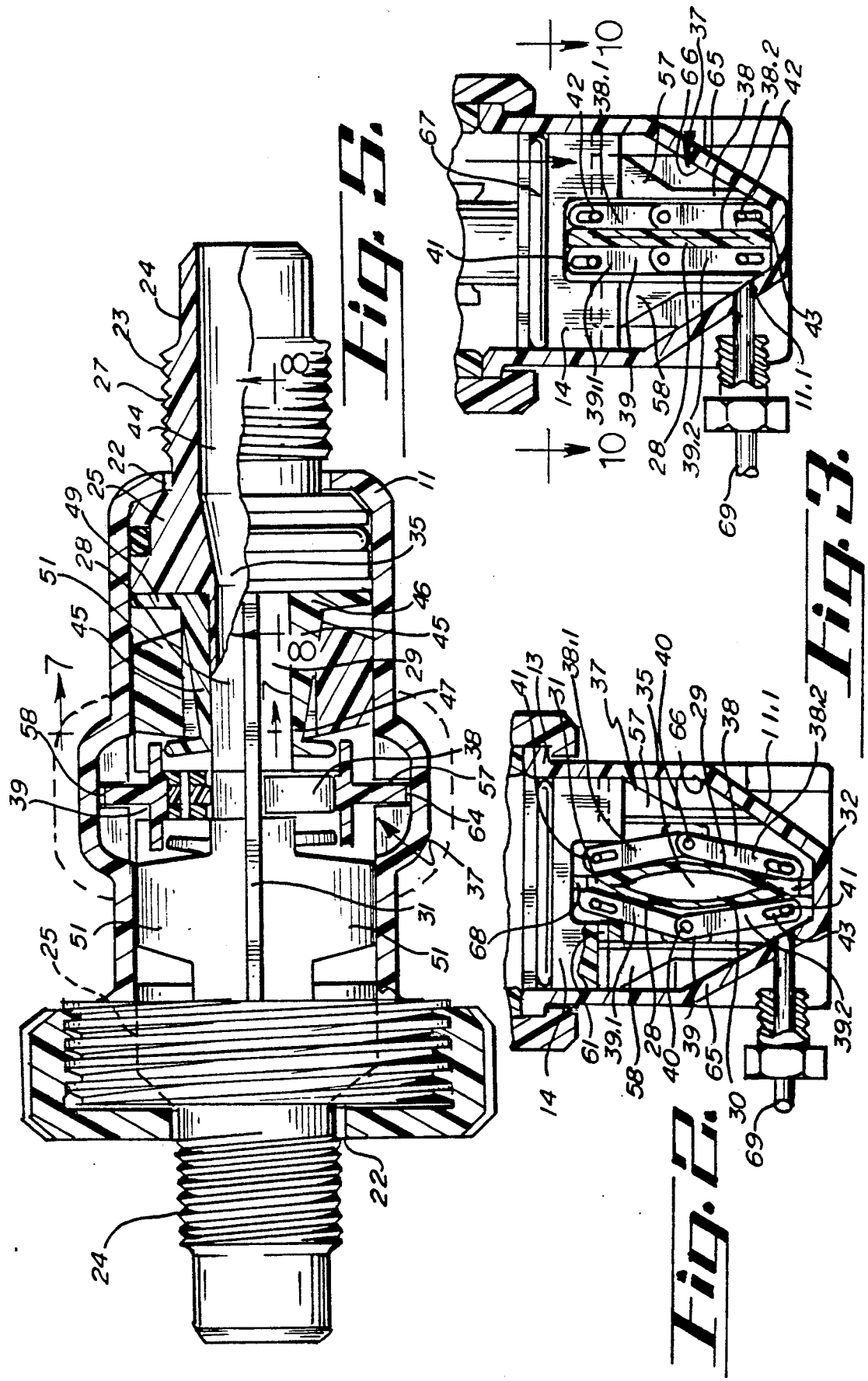

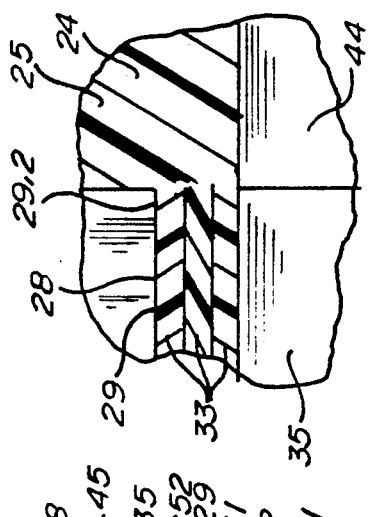

PLASTIC VALVE WITH FLEXIBLE TUBE AND TUBE SQUEEZING APPARATUS

This invention relates to a valve with a flexible tube defining a flow passage and apparatus to squeeze the tube and close the flow passage.

BACKGROUND OF THE INVENTION

In chemical industries, the controlling of the flow of highly corrosive chemicals, such as various acids including hydrofluoric acid, hydrochloric acid, and similar materials, as well as highly corrosive bases such as hydrogen peroxide and similar materials, continues to be a vexing problem because leakage of such liquids out of the flow systems at the valves continues to be a substantial problem. Various plastic poppet valves have been used and weir valves have been used, using diaphragms and other all plastic parts, but prevention of leakage has not been completely accomplished. Previously known clamp valves, closing a flexible tube, have not proven reliable in completely closing the flow passage.

SUMMARY OF THE INVENTION

A feature of the invention is a valve suitable for controlling the flow of highly active chemicals and comprising an elongate distensible and collapsible tubular valving portion capable of being squeezed and deformed to close the flow through the flow passage, and wherein the wall portions of the valving portion comprise a multiplicity of elongate flexible laminae of plastic film lying one on another but free of each other for relative movement. The side edges of the laminae and the wall portions formed thereby are affixed together as by welding and define outwardly protruding side ribs or vanes. The laminae are highly flexible to open a flow passage between certain of the laminae.

Another feature of the invention comprises the collapsible tubular valving portion as described and welded at its opposite ends to stiff plastic tubular end portions or connector pipes for connection to other flow ducts and also functioning to maintain the ends of the collapsing valving portion open.

The valve element and connector pipes may be made of a fluoropolymer which is highly resistant to the deteriorating effects of strong chemicals and which do not have significant elastomeric properties. The laminae of plastic film need only flex slightly in the ordinary operation of this valve and are not prone to rapid deterioration due to wear. Typical of such fluoropolymers is perfluoroalkoxy, known by its trademark Teflon® PFA, although other similar fluoropolymers may be utilized.

Another feature of the valve is the elongate retainer portions which grip and support the welded side ribs of the collapsible valving portion while the valving portion is distended. The clamp bars prevent the laminae, which have been welded together to form the side rib portions, from parting as the valve portion is repeatedly distended.

Another feature of the invention is a pair of squeezing linkages respectively lying against the distensible laminate sidewalls of the tubular valving portions to articulate and apply squeezing pressure against the valving portions to close the flow passage therethrough. A pair of tiltable squeeze bars confront each distensible side of the valving portion and at opposite sides of the adjacent squeezing linkage. Each of the squeeze bars has a pivoting end adjacent the plastic tubular end portion and a swingable squeezing end adjacent the squeezing linkage and applying squeezing force against the distensible side of the tubular portion in coordination with the adjacent squeezing linkage.

Still another feature of the invention is a driving head operated variously by a hand operated handle or by a pneumatic piston applies squeezing pressure onto the squeeze bars through camming impeller portions which cam along oblique and convergent wall portions of the valve body.

BRIEF DESCRIPTION OF THE DRAWINGS

FIG. 2 is a detailed section view taken approximately at 2—2 of FIG. 1.

FIG. 3 is a detailed section view like FIG. 2 except that the valve is shown in closed condition.

FIG. 5 is an enlarged detailed section view taken approximately at 5—5 in FIG. 1 and having certain portions broken away and shown in section for clarity of detail.

FIG. 7 is a greatly enlarged detailed section view taken approximately at 7—7 of FIG. 1.

FIG. 8 is a greatly enlarged detailed section view taken approximately at 8—8 of FIG. 5.

FIG. 9 is a detailed section view taken approximately at 9—9 of FIG. 1.

FIG. 10 is a detailed section view taken approximately at 10—10 of FIG. 3.

FIG. 11 is an elevation view of an alternate form of the invention.

DETAILED SPECIFICATION

Figure 1:
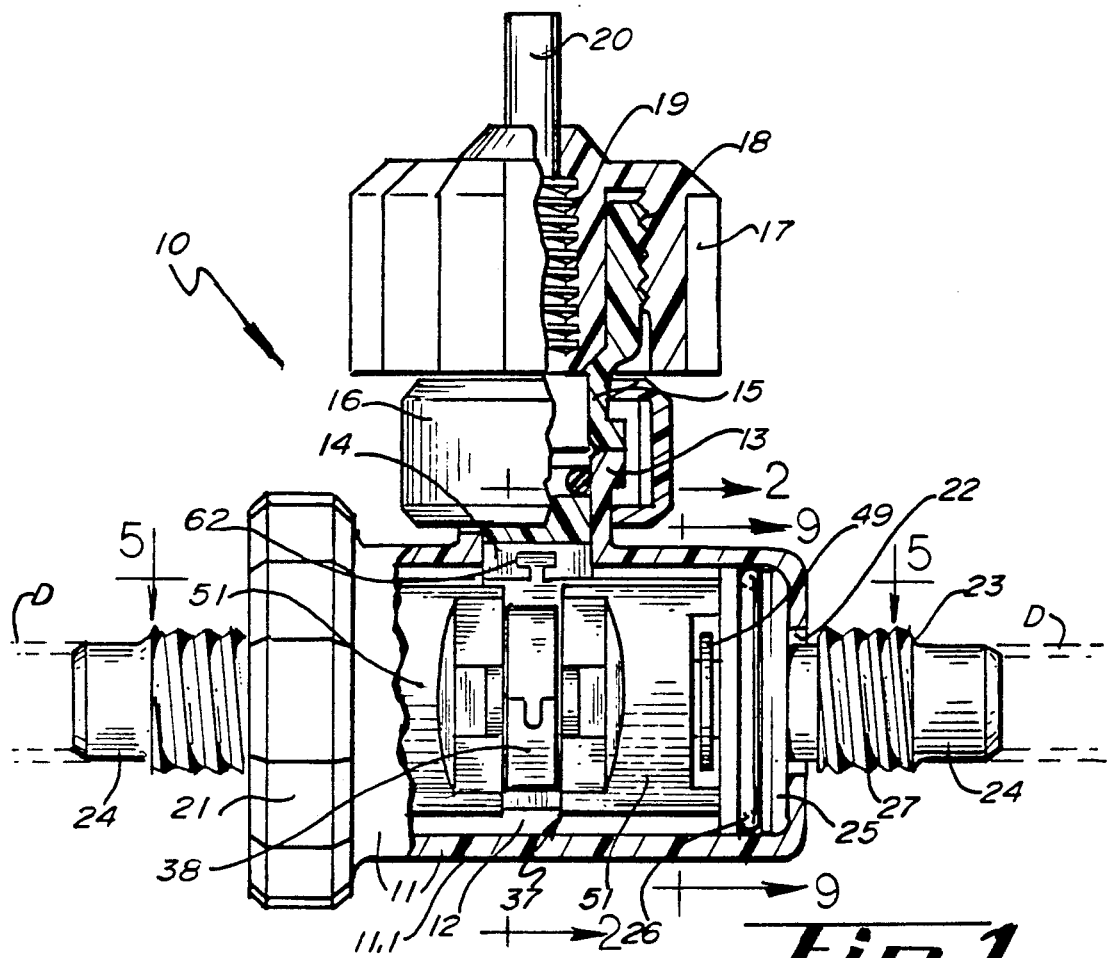
FIG. 1 is an elevation view partly broken away and shown in section for clarity of detail, of the plastic valve.

The plastic valve is indicated in general by numeral 10 and is particularly well adapted for controlling the flow of chemicals in flow ducts D to which the valve 10 is connected.

The valve 10 has a valve body portion 11 having walls 11.1 which define an open interior portion 12 and an upper guiding portion 13 in which an operating or driving head 14 is reciprocally mounted. The upper guiding portion 13 of the valve body portion includes a demountable superstructure 15 retained as a part of the upper guiding portion by a slide-on clamp 16 so as to accommodate the removal of the superstructure 15 and replace it with another comparable superstructure. The superstructure 15 mounts an operating handle 17 rotating on threads 18 and connected by high pitch threads 19 to an operating stem 20 which is connected to the head 14 in order to produce reciprocating movement of the head as the handle 17 is turned. Alternately, the reciprocating movement of the head for operating the valve may be obtained by a pneumatic piston arrangement as illustrated in FIG. 11.

The valve body portion 11 includes a removable cap 21 which is threaded onto the main portion of the valve body portion and which may be removed to obtain access into the interior portion 12. Access ports 22 are provided in the end of the valve body portion 11 and in the cap 21 to receive the plastic valving duct means, indicated in general by numeral 23 of the valve 10. An O-ring seal may be provided between the duct means 23 and the valve body portion 11 at the access ports 22.

The plastic valving duct means 23 comprises a pair of rigid or stiff plastic tubular end portions or pipes 24 which extend through the access ports 22 and each of the rigid tubular end portions 24 has an enlarged and rigid mounting head 25 thereon and formed integrally thereof. Each of the heads 25 has a peripheral groove containing a sealing O-ring 26 therein which seals against the inner surface of the valve body portion 11. The tubular end portions 24 are provided with threads 27 to accommodate a mechanical fitting for connecting the rigid tubular end portions 24 to the flow ducts D. Alternately, and preferably, the tubular end portions are actually welded to the flow ducts D to prevent any potential leakage at the connection.

The plastic valving duct means 23 also includes an elongate tubular collapsible and distensible valving portion 28 extending through the valve body portion 11 and between the enlarged heads 25 of the tubular end portions or pipes 24. The rigid tubular end portions 24 and the collapsible and distensible tubular valving portion 28 are both formed of plastic which is highly resistant to the deteriorating effect of strong chemicals, such as acids and bases, and preferably are formed of a fluoropolymer plastic, such as perfluoroalkoxy, known by its trademark, Teflon PFA. Other plastics may be suitable, but the use of the described plastic has been found to be very functional.

The collapsible and distensible valving portion 28 is formed of a pair of flexible sidewalls 29 and 30. The sidewalls 29, 30 have side edge portions 29.1, 30.1, which are affixed to each other as by welding or solvent bonding, and defining side rib portions 31, 32.

As best illustrated in FIGS. 7 and 8, the flexible sidewall portions 29, 30 of the collapsible and distensible valving portion 28 are made of a multiplicity of laminae 33, 34 of flexible plastic sheet material or film, preferably of the fluoropolymer material known as perfluoroalkoxy, and by its trademark Teflon PFA. In the preferred form, the laminae 33, 34, which make up the flexible wall portions 29, 30, have a thickness of approximately 0.020 inch (0.051 cm). The laminae 33 in the flexible wall portion 29 lie flush against each other, but are free of each other throughout substantially all of the wall portion 29; and in the same way, the laminae 34 in the flexible wall portion 30 also lie flush against each other, but are free of each other, so that each of the laminae may have relative movement with respect to the other laminae in the wall portion. The side edge portions 33.1, 34.1 of the laminae 33, 34 form the side edge portions 29.1, 30.1 of the flexible wall portions 29, 30, and are affixedly secured to each other as by welding or solvent bonding so as to be effectively formed integrally of each other. The side edge portions 33.1, 34.1 of the laminae are also formed integrally of each other as to define the side rib portions 31, 32. It will be recognized in FIG. 7 that the welding of the laminae together and the welding of the wall portions 29, 30 cause the side rib portions 31, 32 to be one thickness of plastic without any trace of laminae therein.

The collapsible and distensible valving portion 28 defines a flow passage 35 between the flexible wall portions 29, 30. When the flexible wall portions are deformed to close the flow passage 35 at the closure portion 36 substantially midway between the rigid tubular end portions 24 and between the headers 25, the wall portions 29, 30 and all of the laminae 33, 34 flex at their side edge portions so that the flexible wall portions lie flush against each other entirely across the collapsible valving portion 28, substantially as illustrated in FIG. 3. It is to be especially noted that whereas the side edge portions 33.1, 34.1 of the laminae 33, 34 are welded together as illustrated in FIG. 7 to define the adjacent side rib portions 31, 32, there is nothing between the flexible wall portions at these side edge portions 33.1, 34.1 as to prevent the wall portions from lying flush against each other and entirely sealing and closing the flow passage 35. As the flexible wall portions 29, 30 and the individual laminae 33, 34 flex between positions opening and closing the flow passage, the amount of flexing required is rather minimal so as to preserve and extend the life of the flexible wall portions and laminae in order to make the valve extremely reliable over a considerable length of life of the valve.

As the flexible wall portions 29, 30 are alternately collapsed as illustrated in FIG. 3 and subsequently distended as illustrated in FIG. 2 for alternately closing and opening the flow passage 35, portions of the side rib portions 31, 32, adjacent the closure portion 36 of the collapsible valving portion will move outwardly away from each other, substantially as illustrated in FIG. 3; and as a result, the side rib portions 31, 32 will flex slightly, and when the squeezing pressure for closing the flow passage 35 is relieved, the flexed rib portions 31, 32 contribute to distending the flexible wall portions 29, 30 into the position illustrated in FIG. 2 so as to reopen the flow passage 35.

The flexible wall portions 29, 30 have wall end portions 29.2, 30.2 which are affixed by welding or solvent bonding to be formed integrally with the rigid tubular end portions 24 and more specifically, to the headers 25 thereof. The several film laminae 33, 34 of the flexible wall portions 29, 30 are similarly welded and formed integrally of the headers 25, but it will be noted that the laminae 33, 34 continue to be free of each other for relative movement to the wall end portions 29.2, 30.2 at which point the laminae are formed integrally with each other and with the header 25.

The rigid tubular end portions 24 of the valving duct means 23 have flow openings 44 therein for conveying liquid chemical which passes through the flow passage 35 of the collapsible valving portion 28. The wall end portions 29.2, 30.2 of the flexible wall portions 29, 30 are welded to the header 25 around the periphery of the flow openings 44 and assume the same shape as the flow openings 44.

Squeezing means 37 are provided in the open interior 12 of the body portion 11 for alternately applying and relieving squeezing pressure upon the closing portion 36 of the collapsible and distensible valving portion 28. Said squeezing means comprises a pair of elongate squeezing linkages or closing portions 38, 39. Each of the linkages 38, 39 includes a pair of individual links 38.1, 38.2 and 39.1, 39.2 connected together by pivots 40 so that the individual links may be articulated with respect to each other. The end portions 41 of the squeezing linkages 38, 39 are pivotally mounted and anchored upon mounting pins 42 which extend through slot-shaped apertures 43 in the end portions 41 of the linkages.

Figure 4:
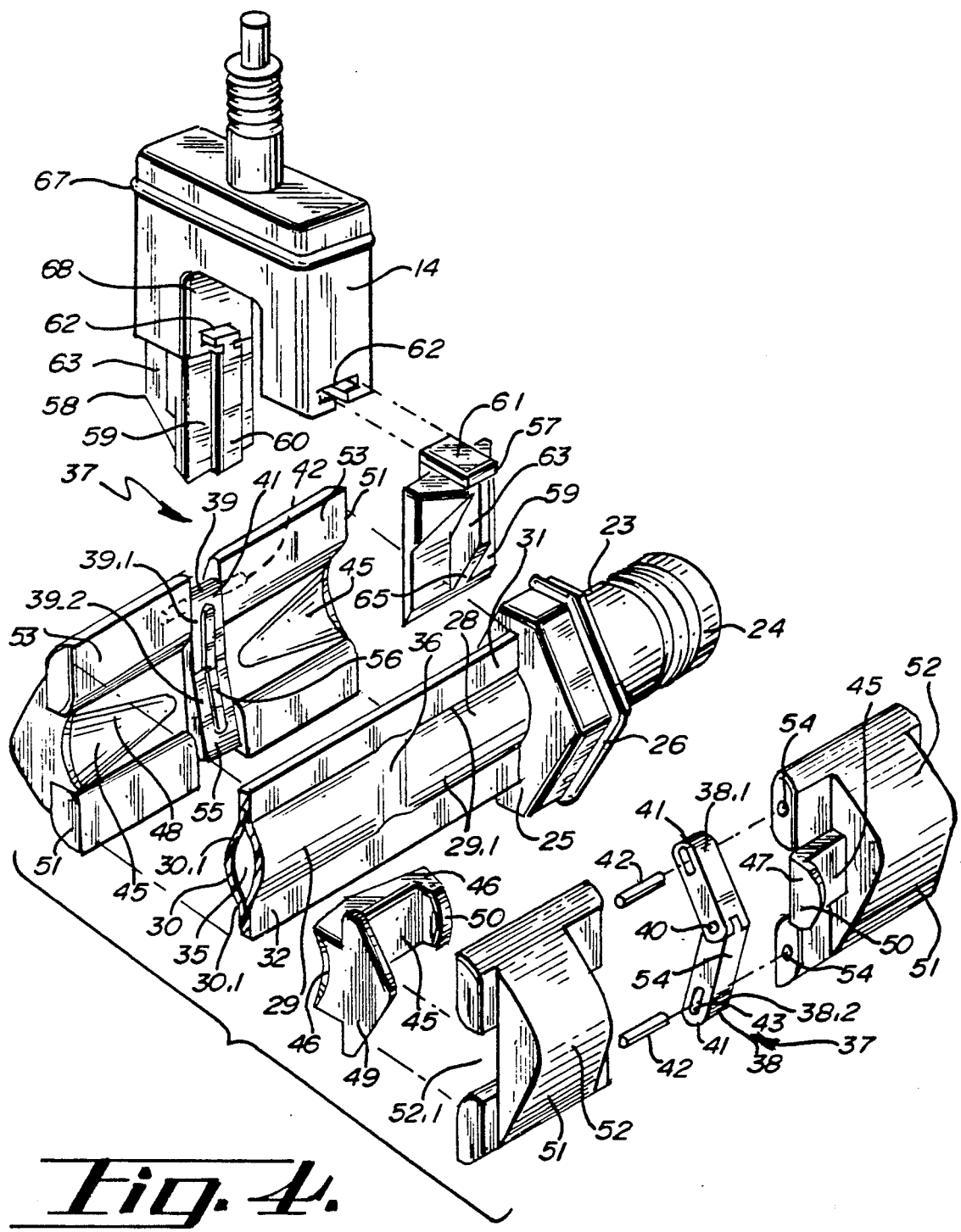
FIG. 4 is a perspective view showing, in detail, and in exploded relationship, the principal operating parts of the valve.

The squeezing means 37 also includes a plurality of elongate squeeze bars 45 which lie along the flexible wall portions 29, 30 of the collapsible valving portion 28 and extend between the squeezing linkages or closing portions 38, 39 and the headers 25 which are a part of the rigid tubular end portions 24. The squeeze bars 45 have pivoting end portions 46 disposed adjacent the headers 25, and tiltably squeezing end portions 47 disposed immediately adjacent the squeezing linkages 38, 39. As best seen in FIG. 4, the squeeze bars 45 have rounded and tapered concave engaging faces 48 which bear against the flexible wall portions 29, 30 of the collapsible valving portion 28 and support the wall portions 29, 30 as the wall portions are distended to open the flow passage 35 as in FIG. 2 and as the wall portions are collapsed to close the flow passage 35. Squeeze bars 45 also support the flexible wall portions 29, 30 during the transition between such open and closed conditions. The squeeze bars 45 also have flanges 49, 50 at their opposite ends. The flanges 50 are on the squeezing end portions 47 of the squeeze bars and are disposed immediately adjacent the squeezing linkages 38, 39 to be operated simultaneously with the linkages for squeezing the collapsible valving portion 28.

The flanges 49 on the pivoting end portions 46 of the squeeze bars 45 abut against the headers 25 of the stationary tubular end portions 24 when the collapsible valving portion 28 is in distended condition, as illustrated in FIG. 5.

The squeezing means 37 also includes a plurality of spacer portions 51 in the valve body portion 11. At each side of the collapsible valving portion 28, there are two sets of spacer portions 51; and each of the spacer portions 51 extends between one of the squeezing linkages 38, 39 and one of the adjacent headers 25 which is part of the rigid tubular end portion 24. The spacer portions 51 have convex outer surface portions 52 which conform to the shape of the sidewall 11.1 of the valve body portion, particularly as seen in FIGS. 4 and 9. The spacer portions 51 also have substantially flat faces 53 confronting each other and facing the side rib portions 31, 32 of the collapsible valving portion 28 as to provide a retaining means confronting the side rib portions 31, 32, the retaining means or faces 53 contribute to preventing the side rib portions 31 from parting and from opening the welds between the flexible wall portions 29, 30 by which the side rib portions 31, 32 are formed. The space 53.1 between the faces 53 of the spacer portions is slightly greater than the thicknesses of the side rib portions 31, 32 as to permit some limited sliding movement of the rib portions 31, 32 in the space 53.1 between the faces 53 as the side rib portions 31, 32 flex slightly during alternate collapsing and distending of the collapsible valving portion 28. The spacers 52 have recesses 52.1 between faces 53 to receive the squeeze bars 45 and the flanges 49, 50 thereof, and to provide room for the distension of the flexible wall portions 29, 30 when squeezing pressure is relieved. The spacers 52 also maintain the collapsible valving portion 28 in alignment with the rigid tubular end portions 24 and prevent any bending of the collapsible valving portion 28.

Each of the spacers 52 also has apertures 54 adjoining the squeezing linkages 38 and receiving the mounting pins 42 therein for anchoring the end portions 41 of the linkages 38 in closely spaced relation with respect to the side rib portions 31, 32. It will be recognized that the spacers 51 and the mounting pins 42 cooperatively define mounting means for the end portions of the linkages 38.

As illustrated in FIGS. 2 and 3, the end portions 41 of the linkages are disposed in closely spaced relation with the side rib portions 31, 32, and when squeezing pressure is removed or relieved from the linkages 38, the adjoining linkage end portions 41 extend divergently with respect to each other so that the linkages generally follow the distended shape of the collapsible valving portion 28. Because the end portions 41 of the links lie close against the side rib portions 31, 32 of the collapsible valve portion 28, the linkages 38, when squeezed together as illustrated in FIG. 3, will squeeze the entire width of the flexible wall portions 29, 30 of the collapsible valving portion 28 and entirely close the flow passage 35 therein. As the linkages are squeezed inwardly from the articulated position illustrated in FIG. 2, and to the aligned position of FIG. 3, the linkages start closing the collapsible valve portion initially adjacent the side rib portions and then progressively inwardly until the entire width of both flexible wall portions 29, 30 lie flush against each other. As illustrated in FIG. 4, the faces 55 of the squeezing linkages 38, 39 have protruding ribs 56 thereon to localize the pressure being applied by the linkages onto the closing portion 36 of the collapsible valving portion 28. Ribs 56 may have smoothly rounded surfaces to engage the flexible wall portions 29, 30.

The squeezing means 37 also include a pair of camming impeller portions 57, 58, each of which has a depending finger portion 59 with a bearing rib 60 thereon. The finger portions depend from the driving head 14 adjacent the two squeezing linkages 38, 39 and the bearing ribs 60 engage the linkages 38, 39 for applying squeezing pressure thereto. The fingers 59 also engage the adjacent end flanges 50 of the squeeze bars 45 for applying squeezing pressure thereagainst and causing, when pressure is applied, tilting of the squeeze bars 45 which also apply pressure against the flexible wall portions 29, 30 of the collapsible valving portion 28. Because of the support given by squeeze bars 45 to the flexible wall portions 29, 30 in both open and closed conditions of the collapsible valving portion 28, and in transition between such open and closed conditions, the squeeze bars 45 also allow the collapsible valving portion to accommodate substantially higher fluid pressures within the flow passage without any likelihood of rupturing any portion of the collapsible valving portion 28.

The camming impeller portions 57, 58 have slides 61 at their upper ends which slide in tracks 62 in the lower portions of the driving head 14 in order to permit the camming impeller portions 58 to move toward and away from the collapsible valving portion 28 and toward and away from the squeezing linkages 38, 39.

The camming impeller portions 57, 58 reciprocate upwardly and downwardly with the driving head 14 as the handle 17 is operated, and each of the camming impeller portions has an upright guiding rib 63 slidably received in an upright guiding groove 64 formed in the wall portion 11.1 of the valve body portion 11.

Each of the camming impeller portions also has an oblique camming edge surface 65 on each of the guiding ribs 63 which bears against the oblique inner camming surface 66 of the wall portion 11.1 of the valve body portion 11. The camming action between the camming surfaces 65 on the camming impeller portions 57, 58, and the camming surfaces 66 on the wall portions 11.1 produce inward sliding movement of the camming impeller portions 57, 58 toward the squeezing linkages 38, 39 and toward the collapsible valving portion 28 as the driving head 14 moves the camming impeller portions downwardly. Accordingly, the camming impeller portions 57, 58 move from the position illustrated in FIG. 2 to the position illustrated in FIG. 3 as the driving head 14 moves downwardly.

The driving head 14 has an O-ring seal 67 sealing the driving head against the guiding portion 13 of the valve housing. The O-ring seal 67 and the O-ring seal 26 on the header 25 cooperate to provide secondary containment of liquids in the unlikely event of a failure of the collapsible valving portion 28. Alternatively, the cylindrical portions of the rigid tubular end portions 24 may be sealed to the body portion 11 by O-rings at or adjacent to the access ports 22, to cooperate with O-ring seal 67 in providing secondary containments. The driving head is arch-shaped, defining a tunnel 68 so as to avoid interference with the end portions 41 of the linkages and the adjacent portions of spacers 52.

As a precaution against any liquid leakage or collection of liquid within the body portion 11, a sensor probe 69 is mounted on the body portion and is sensitive to the conditions in the open interior. The sensor probe 69 is described in copending application Ser. No. 019,039 filed Feb. 19, 1993, owned by the assignee of this application.

Figure 6:
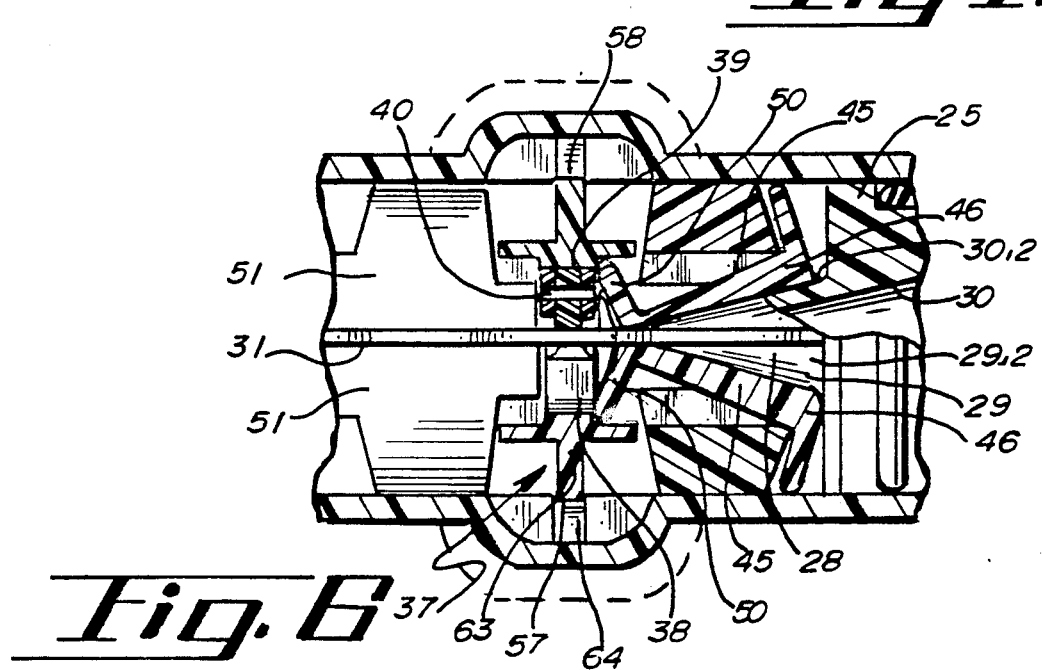
FIG. 6 is an enlarged detailed section view similar to portions of the FIG. 5, but showing the valve in closed condition.

When the valve is to be operated, the flow passage 35 is normally open and the collapsible valving portion 28 is normally distended to allow liquid flow through the flow passage. By manipulating the handle 17, the driving head 14 is moved downwardly, causing the camming impeller portions 57, 58 to move downwardly therewith, and the camming impeller portions are cammed along the oblique camming surfaces 66 to move the camming impeller portions inwardly toward the collapsible valving portion 28. The camming impeller portions 57, 58 slide inwardly along the tracks 62 and pressure is applied by the camming impeller portions and particularly the fingers 59 and bearing ribs 60 thereof against the linkages 38, 39 and against the flanges 50 of the squeeze bars 45. As the pressure is applied onto the squeeze bars 45, they move from the position illustrated in FIG. 5 wherein they lie parallel along the collapsible valving portion and the squeeze bars 45 progressively tilt inwardly until they reach the position illustrated in FIG. 6 so as to deform and support the entire length of the collapsible valving portion between the squeezing linkages 38, 39 and the stationary rigid headers 25.

Also as the camming impellers 57, 58 move inwardly, the linkages 38, 39 are articulated and the linkages move from the position illustrated in FIG. 2 to that illustrated in FIG. 3 wherein the linkages are substantially parallel with each other and apply pressure entirely across the width of the collapsible valving portion 28 to entirely close the flow passage 35. When the valve is again to be opened, the handle 17 is again manipulated so as to raise the driving head 14 and lift the camming impeller portions 57, 58. Raising the camming impeller portions relieves the squeezing pressure from the linkages 38, 39 and from the squeeze bars 45; and as a result, liquid pressure in the flow passage 35 will distend the flexible wall portions. When the collapsible valve portion was closing, the side rib portions 31, 32 had flexed slightly outwardly, and, as the squeezing pressure is relieved, the side rib portions 31, 32 resiliently return to their natural straight shape and this straightening of the side rib portions 31, 32 contributes to opening the collapsible valving portion 28. When the collapsible valving portion 28 had been closed, the inward movement of the flexible wall portions 29, 30, caused by the linkages 38, 39 and by the squeeze bars 45, cause the flexible wall portions to be slightly tensioned. The slight tension on these flexible wall portions 29, 30 also contributes to distending the collapsible valving portion 28 again when the squeezing pressure of linkages 38, 39 and squeeze bars 45, causing the outward movement of the flexible wall portions 29, 30 into the position illustrated in FIG. 2.

With reference to FIG. 11, an alternate form of the valve 10.1 is illustrated. The valve is entirely the same as the valve of FIGS. 1-10 with the exception that the valve 10.1 incorporates a pneumatic piston 68 operating a stem 69 which drives the driving head 14.1 in a manner similar to the movement of the head 14 in FIGS. 1-10. Reciprocating movement of the head 14.1 produces the same operation as previously described. A return spring 70 is provided with the pneumatic piston 69 to return the piston and the driving head 14.1 to its upward position when pneumatic pressure is relieved.

One of the principal advantages of using this squeeze valve is to maintain the purity of the chemicals being conveyed through the ducts D and through the valve 10 or 10.1. In addition, the flow of the chemical in the flow passage may be entirely shut off without leakage. Because the laminae 33, 34 are permitted to move slightly with respect to each other, potential wear or cracking due to flexing is minimized.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A plastic valve for connection to flow ducts for controlling liquids flowing therethrough comprising,
    a valve body portion comprising an elongate open interior portion and also comprising end portions with access ports opening into said open interior,
    plastic valving duct means extending through the open interior of the body portion and comprising stiff plastic tubular end portions and an elongate tubular plastic collapsible and distensible valving portion affixed to and between said tubular end portions, said tubular end portions extending out of the access ports for connection to such flow ducts, said collapsible valving portion comprising a pair of flexible wall portions and a closable flow passage between said wall portions and the valving portion also comprising a pair of stiff and resilient side rib portions adjoining the wall portions, the flexible wall portions being opposite to each other and in confronting relation to each other, said flexible wall portions having wall end portions affixed to said tubular end portions, said flexible wall portions comprising a multiplicity of flexible laminae of plastic film lying against each other and being free of each other to permit relative movement between adjacent laminae, each of said wall portions comprising side edge portions each joined and affixed to the adjoining side edge portion of the opposite wall portion, the joined side edge portions of said wall portions defining said side rib portions, said flexible laminae comprising laminae side portions affixed to each other in said side rib portions and being immovable with respect to each other, and squeezing means in the open interior of said body portion and engaging said flexible wall portions, said squeezing means applying convergent squeezing pressure onto said flexible wall portions and deforming the wall portions to close the flow passage and restrict the liquid flow through the flow passage, and said squeezing means alternately relieving the squeezing pressure on the wall portions to permit the flow passage to reopen.

2. A plastic valve according to claim 1 wherein said laminae side portions of the flexible laminae are welded to each other in said side rib portions.

3. A plastic valve according to claim 1 wherein said side edge portions of the wall portions are welded to each other in said side rib portions.

4. A plastic valve according to claim 1 wherein said laminae side portions of the flexible laminae are solvent bonded to each other in said side rib portions.

5. A plastic valve according to claim 1 wherein the adjoining side edge portions of the wall portions are affixed together and are in one piece with respect to each other.

6. A plastic valve according to claim 1 wherein the wall end portions of said flexible wall portions are welded to said tubular end portions of the duct means.

7. A plastic valve according to claim 6 wherein each of the flexible laminae of the flexible wall portions is welded to said tubular end portions of the duct means.

8. A plastic valve according to claim 6 wherein the tubular end portions of the duct means comprise flow openings of fixed shape and communicating with the flow passage of the collapsible valving portion, the wall end portions of said flexible wall portions being fixedly shaped around the flow passage and adjacent the tubular end portions, the fixed shape of the wall end portions urging the wall portions to reopen the flow passage when the squeezing pressure of the squeezing means is relieved.

9. A plastic valve according to claim 1 wherein said tubular end portions are substantially rigid, said stiff side rib portions of said collapsible valving portion extend entirely between and are affixed to said tubular end portions, and a pair of plastic retainer means extending along and confining said pair of side ribs, each of the retainer means extending throughout substantially the full length of the side rib portions, the side rib portions being deformed as the wall portions are deformed into engagement with each other in response to application of squeezing pressure onto the collapsible valving portion, and said rib portions resiliently urging the wall portions to reopen the flow passage when the squeezing pressure is relieved.

10. A plastic valve according to claim 1 wherein the squeezing means comprises a pair of elongate squeezing linkages receiving the collapsible and distensible valving portion therebetween, each of said elongate squeezing linkages traversing one wall portion of the valving portion and comprising linkage end portions adjacent said side rib portions, mounting means anchoring said linkage end portions as said linkages articulate inwardly to apply squeezing pressure onto the flexible wall portion.

11. A plastic valve according to claim 10 wherein each of said squeezing linkages comprises a pair of links pivotally connected together.

12. A plastic valve according to claim 10 wherein the linkage end portions extend divergently of each other adjacent each of said side rib portions and generally follow the distended shape of the collapsible valving portion, and said squeezing linkages applying squeezing pressure all across the flexible wall portions of the collapsible valving portion to entirely close the flow passage between the side rib portions.

13. A plastic valve according to claim 10 wherein said mounting means comprising spacer portions between the valve body portion and the flexible wall portions of the collapsible valving portion, and said spacer portions extending between the squeezing linkages and the stiff tubular end portions of the duct means, the spacer portions maintaining the position of the collapsible valve portion in the valve body portion.

14. A plastic valve according to claim 10 wherein said squeezing means also comprises a pair of camming impeller portions each adjacent a respective flexible wall portion of the collapsible valving portion and movable toward and away from each other and toward and away from the adjacent wall portions, said camming impeller portions engaging said elongate squeezing linkages for moving the linkages against the flexible wall portions and thereby deforming the wall portions and closing the flow passage in the collapsible valving portion, driving head means reciprocably mounted in the valve body portion and engaging said camming impeller portions for moving the camming impeller portions therewith, said driving head means also permitting movement of the camming impeller portions toward and away from the flexible wall portions of the collapsible valving portion, and camming portions on said camming impeller portions and on the valve body portion and moving said camming impeller portions toward the flexible wall portions to close the flow passage in response to movement of the driving head means in the valve body portion.

15. A plastic valve according to claim 14 and said squeezing means also comprising squeeze bars extending along the flexible wall portions between said squeezing linkages and said stiff tubular end portions, said squeeze bars comprising pivoting end portions adjacent the stiff tubular end portions of the duct means and also comprising tiltably squeezing end portions adjacent said squeezing linkages and progressively deforming the tubular valving portion between the stiff tubular end portions and the squeezing linkages, said camming impeller portions also comprising elongate fingers extending transversely of the elongate collapsible valving portion and of said flexible wall portions and moving toward and against said squeezing linkages and against the tiltably squeezing end portions of the squeeze bars for moving both the linkages and the squeezing end portions of the squeeze bars toward the flexible wall portions of the collapsible valving portion.

16. A plastic valve according to claim 1 where in said squeezing means extends along said collapsible valving portion and substantially to said stiff tubular end portions, said squeezing means comprising a closing portion disposed intermediate said stiff tubular end portions and applying localized squeezing pressure onto the collapsible tubular portion to entirely close the flow passage, and said squeezing means also comprising tiltable squeeze bars extending along the flexible wall portions between said closing portion and said stiff tubular end portions, said squeeze bars comprising pivoting end portions adjacent the stiff tubular end portions of the duct means and also comprising tiltably squeezing end portions adjacent said closing portion and progressively deforming the tubular valving portion between the stiff tubular end portions and closing portion at which the flow passage is closed.

17. A plastic valve according to claim 16 wherein said closing portion comprises a pair of elongate squeezing linkages receiving the collapsible and distensible valving portion therebetween, each of said elongate squeezing linkages traversing one wall portion of the valving portion and comprising linkage end portions adjacent said side rib portions, mounting means anchoring said linkage end portions as said linkages articulate inwardly to apply squeezing pressure onto the flexible wall portion.

18. A plastic valve according to claim 16 wherein said squeezing means also comprises spacer portions between the tiltable squeeze bars and the body portion, said spacer portions extending between the closing portion and the stiff tubular end portions of the duct means, said spacer portions mounting said tiltable squeeze bars.

19. A plastic valve according to claim 1 wherein said squeezing means comprises a pair of camming impeller portions each adjacent a respective flexible wall portion of the collapsible valving portion and movable toward and away from each other and toward and away from the adjacent wall portions for applying said squeezing pressure thereon for deforming the wall portions and closing the flow passage and for relieving said squeezing pressure, a driving head portion reciprocally mounted in the valve body portion and having reciprocating movement toward and away from said collapsible valving portion, said driving head portion mounting and moving said camming impeller portions reciprocally in the directions of reciprocation of the driving head portion as the driving head portion moves toward and away from the collapsible valving portion, and said driving head portion also permitting movement of said camming impeller portions toward and away from the wall portions, and camming portions on said camming impeller portions and on the valve body portion and moving said camming impeller portions toward the flexible wall portions to close the flow passage in response to movement of the driving head portion in the valve body portion.

20. A plastic valve according to claim 19 wherein said driving head portion comprises track portions oriented transversely of the direction of said reciprocating movement, and said camming impeller portions comprising slide portions on said track portions and moving therealong toward and away from said flexible wall portions.

21. A plastic valve according to claim 19 wherein said camming impeller portions comprise elongate fingers extending transversely of the elongate collapsible valving portion and of said flexible wall portions thereof and movable toward said flexible wall portions for deforming the valving portion.

22. A plastic valve for connection to flow ducts for controlling liquids flowing therethrough comprising, a valve body portion comprising an elongate open interior portion and also comprising end portions with access ports opening into said open interior, the valve body portion also comprising an elongate guideway extending transversely of said elongate open interior portion, and the valve body portion also comprising a pair of rigid and stationary valve body camming wall portions adjoining said open interior portion and opposite said guideway, the valve body wall portions being obliquely oriented with respect to each other and extending convergently away from said open guideway, plastic valving duct means extending through the open interior of the body portion and comprising rigid plastic tubular end portions and an elongate plastic collapsible and distensible valving portion affixed to and extending between said tubular end portions, said end portions comprising rigid pipe portions extending out of said access ports of the valve body portion for connection to such flow ducts, and said tubular end portions also comprising enlarged headers within the open interior portion of the valve body portion and adjacent said access ports, the tubular end portions having flow openings therethrough of fixed shape, said collapsible valving portion comprising a closable flow passage communicating with the flow openings of the tubular end portions and also comprising a pair of flexible wall portions opposite to each other and in spaced and confronting relation to each other and defining said flow passage therebetween, said flexible wall portions having wall end portions affixed to the headers of said tubular end portions and about the peripheries of said flow openings in the tubular end portions, and each of said wall portions comprising side edge portions each joined and affixed by welding to the adjoining side edge portions of the opposite wall portion, the joined side edge portions of said wall portions defining a pair of stiff and resilient side rib portions extending throughout the length of the elongate plastic collapsible valving portion and affixed to said headers of the tubular end wall portions, said wall portions of the collapsible valving portion comprising a multiplicity of flexible laminae of plastic film lying against each other and being free of each other to permit relative movement between adjacent laminae, the flexible laminae also comprising laminae side portions affixed by welding to each other in said side rib portions and being immovable with respect to each other, said side wall portions of the collapsible valving portion and the multiplicity of laminae in said wall portions being flexible and deformable so that the opposite flexible wall portions may engage each other and close the flow passage at a location intermediate said wall end portions and the headers to which said wall end portions are affixed, said side rib portions flexing slightly as said wall portions are deformed and flexed into engagement with each other during closing of the flow passage, and said side rib portions resiliently urging the wall portions away from each other to reopen the flow passage when squeezing pressure on the wall portions is relieved, a pair of elongate plastic retainer means extending along and confining said pair of side rib portions, each of the retainer means extending throughout substantially the entire length of said side rib portions, squeezing means in the valve body portion and engaging said flexible wall portions of the collapsible valving portion of the duct means and alternately applying and relieving squeezing pressure onto the flexible wall portions and deforming the wall portions into engagement with each other to close the flow passage and restrict liquid flow through the flow passage and to allow the wall portions to return away from each other to reopen the flow passage when squeezing pressure is relieved, said squeezing means comprising a pair of elongate squeezing linkages receiving the collapsible valving portion of the duct means therebetween, each of said elongate squeezing linkages traversing one flexible wall portion of the collapsible valving portion, each of said squeezing linkages comprising a pair of links pivotally connected together, said squeezing linkages also comprising linkage end portions anchored adjacent said side rib portions and pivotally connected together, said linkage end portions extending divergently of each other and generally following the distended shape of the collapsible valving portion, and said squeezing linkages applying squeezing pressure all across the flexible wall portions to entirely close the flow passage between the side rib portions, said squeezing means also comprising a plurality of tiltable squeeze bars extending along the flexible wall portions between said squeezing linkages and said stiff tubular end portions of the duct means, said squeeze bars comprising pivoting end portions adjacent the stiff tubular end portions of the duct means and also comprising tiltably squeezing end portions adjacent said squeezing linkages and said squeeze bars progressively deforming the flexible wall portions of the collapsible tubular valving portion between the stiff tubular end portions and said squeezing linkages, mounting means within the valve body portion and anchoring said linkage end portions adjacent said side rib portions and also tiltably mounting said squeeze bars, said mounting means comprising spacer portions extending between the squeezing linkages and the stiff tubular end portions of the duct means, a pair of camming impeller portions in the open interior of the valve body adjacent the squeezing linkages, said camming impeller portions being movable toward the flexible sidewalls of the collapsible valving portion and applying squeezing pressure onto the squeezing linkages and onto the tiltably squeezing end portions of said squeeze bars for closing the flow passage, and a driving head portion reciprocally mounted in the valve body portion and moving toward and away from the collapsible valving portion, said driving head portion mounting and moving said camming impeller portions reciprocally in the direction of reciprocation of the driving head portion as the driving head portion moves toward and away from the collapsible valving portion, said driving head portion comprising track portions oriented transversely of the direction of said reciprocating movement and said camming impeller portions comprising slide portions on said track portions and moving therealong toward and away from the squeezing linkages and the squeeze bars, the valve body portion comprising stationary convergent wall portions defining camming surface portions engaging said camming impeller portions and guiding said camming impeller portions toward the collapsible portion as the impeller portions are moved by said driving head portion in said reciprocating movement.

* * * * *